June 9, 1931.   J. L. PORTER   1,808,970

METER SEAL

Filed Nov. 19, 1928

Inventor
JOHN LAWRENCE PORTER

By
Attorneys

Patented June 9, 1931

1,808,970

UNITED STATES PATENT OFFICE

JOHN LAWRENCE PORTER, OF COLUMBUS, OHIO

METER SEAL

Application filed November 19, 1928. Serial No. 320,276.

This invention relates more especially to devices of the kind that are commonly called meter seals and are secured around the couplings of pipes where they enter the meters to detect unauthorized access to and manipulation of the couplings for the purpose of unlawfully appropriating the gas, water or other supply through the pipe.

Such devices ordinarily comprise a pair of shells adapted when properly placed together to inclose the coupling, said shells being hooked or secured together at one end and united and locked at the other end by a frangible key, and the object of the present invention is to make improvements in both the shell and key whereby the unlawful separation of the shells is rendered more difficult and obvious. Other objects are to simplify and lessen the cost of manufacturing such devices.

The invention is embodied in the example herein shown and described, the features of novelty being finally claimed.

In the accompanying drawings—

Figure 1:
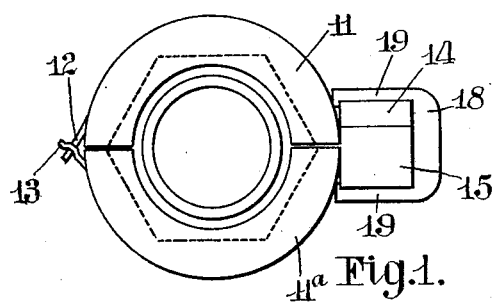
Figure 1 is a side view of the seal according to my invention as the same appears on a coupling, the pipe being shown in end elevation.
Figure 3:
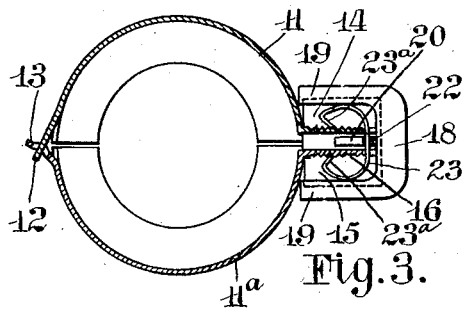
Fig. 3 is a section on the line III—III Fig. 2.
Figure 2:
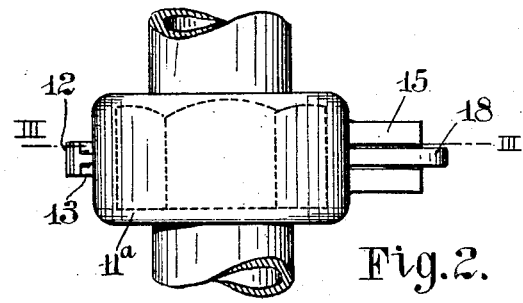
Fig. 2 is a top plan view of the device as seen in Fig. 1.
Figure 4:
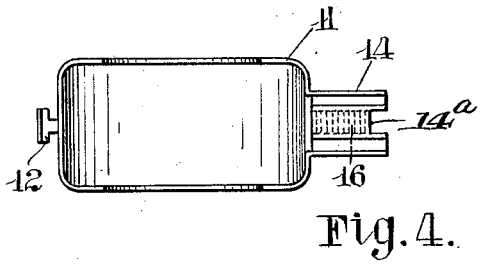
Fig. 4 is a view looking toward the interior of the upper shell section of Figs. 1 and 2.
Figure 7:
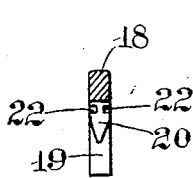
Fig. 7 is a section on the line VII—VII Fig. 6 of the key body with the spring hook removed.
Figure 5:
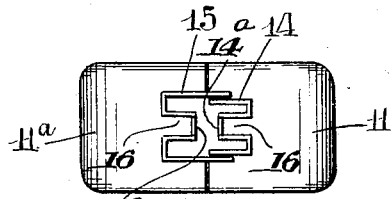
Fig. 5 is a view of the neck end of the connected shell sections with the locking or sealing key not inserted.
Figure 6:
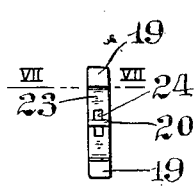
Fig. 6 is an end view of the key alone looking toward the left as the same is positioned in Fig. 3.
Figure 8:
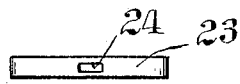
Fig. 8 is a plan view of the spring hook before application to the key body.

In the views 11 and 11$^a$ designate the shell sections for inclosing the pipe coupling. These sections are preferably made of pressed sheet steel. The shell section 11 is formed at its rear end with a bent out tongue 12 having a T-shaped end, and the section 11$^a$ has at the corresponding end a bent out tongue 13 formed with a slot of such form and position that to connect the shell sections it is necessary to place the shells out of coupled position and turn one in relation to the other to engage the T-shaped tongue 12 with the slotted tongue 13. After they are so engaged the shell sections can be placed in complementing position to enclose the couplings as seen in Figs. 1, 2 and 3. The construction involves the disfigurement or destruction of one or both of said tongues if it be attempted to separate the sections at that end while the shell sections are locked in a coupling sealing position.

The forward end of each of the shell sections is formed with a neck section as shown at 14 and 15, each being of channel or groove form at its outer side as shown at 16 with the bottom of the groove toothed or serrated with the teeth pointing rearward. The neck section 14 is made narrower than the neck section 15 so that it shall fit between the end walls of the latter as shown. The outer ends of the grooves at 16 are cut away to form notches 14$^a$ and 15$^a$.

The "key" or ultimate securing device for the shells includes a head portion 18 from which extends end legs 19 spaced from each other to enter the external grooves and a short middle leg 20. The middle leg 20 is made with a tapered terminal T-end, it being formed by opposite notches 22 near the end of said leg. The portion of the key thus described is frangible and advantageously of cast metal.

Secured in the key is a flat metal spring 23 having its ends bent inwardly at 23$^a$ to form hooks. Said spring is perforated at its middle with a slot 24 adapted to permit the spring to be placed on the terminal T-end of the leg 20 and given a quarter turn at the notches 22 with the opposite sides bearing against the inner sides of the legs 19. By this means the spring is held from loss and in position to be applied to the neck section of the seal. The key thus constructed is applied to the neck sections when closed as shown in Fig. 3 by pressing it so that the outer legs enter the external grooves 16 and the head portion the notches 14ª and 15ª whereupon the hooks of the springs will engage serrations in the bottom of said grooves. Because the outer legs enter the external grooves the shells and the frangible part of the seal is secured to the neck sections, the shells cannot be separated in any direction, hence when the sealing key is in place the shells can only be separated by the destruction of the cast metal portion of that member, which, of course, affords the evidence of unlawful tampering with it. The fact that the legs of the key enter the grooves 16 not only secures the key from lateral or turning movement but also makes it impracticable to get at the spring by way of the groove to destroy or remove it.

The forms of the parts can be changed without departing from the gist of the invention as claimed.

What I claim is:

1. A sealing device for a pipe coupling including a pair of shells provided with cooperating neck members, one of which neck members has a groove at the outer side thereof, a key for locking said neck members together including a head portion provided with a leg to enter said groove, and a spring carried by said key having a hook to engage the bottom of said groove to prevent the withdrawal of the key.

2. A sealing device for a pipe coupling including a pair of shells provided with matching neck members, each of said neck members provided with a groove having a serrated bottom at its outer side, a key for locking said neck members together including a head portion provided with legs to enter said grooves, and a spring having hooks at its ends carried by said key to engage serrated bottoms of the grooves to prevent the removal of the key.

3. A sealing device for a pipe coupling including a pair of shells provided with cooperating neck members, each of said neck members provided with a groove at the outer side thereof, a key for locking said neck members together including a head portion provided with legs to enter said grooves, and an intermediate tongue carrying a spring having hooks at its ends to engage the walls of said groove to prevent the withdrawal of said key.

4. A sealing device for a pipe coupling including a pair of shells provided cooperating neck members, each of said neck members provided with a groove at its outer side and having a notch at the outer terminus of the bottom thereof, a key for locking said neck members together including a head portion provided with a leg to enter each of said grooves and a spring having hooks at its ends carried by said key to engage the bottoms of said grooves to prevent withdrawal of the key, the head portion of said key entering said notches.

JOHN LAWRENCE PORTER.